(12) United States Patent
Rusch et al.

(10) Patent No.: US 12,092,124 B2
(45) Date of Patent: Sep. 17, 2024

(54) SECONDARY-FLUID SUPPLY FOR THE DIFFUSER OF A COMPRESSOR STAGE

(71) Applicant: TURBO SYSTEMS SWITZERLAND LTD., Baden (CH)

(72) Inventors: Daniel Rusch, Wettingen (CH); Jean-Francois Tissot, Bergheim (FR)

(73) Assignee: TURBO SYSTEMS SWITZERLAND LTD., Baden (CH)

( * ) Notice: Subject to any disclaimer, the term of this patent is extended or adjusted under 35 U.S.C. 154(b) by 0 days.

(21) Appl. No.: 17/920,494

(22) PCT Filed: Apr. 23, 2021

(86) PCT No.: PCT/EP2021/060708
§ 371 (c)(1),
(2) Date: Oct. 21, 2022

(87) PCT Pub. No.: WO2021/214311
PCT Pub. Date: Oct. 28, 2021

(65) Prior Publication Data
US 2023/0142730 A1    May 11, 2023

(30) Foreign Application Priority Data
Apr. 24, 2020  (EP) .................................... 20171388

(51) Int. Cl.
*F04D 27/02*   (2006.01)
*F04D 29/28*   (2006.01)
*F04D 29/44*   (2006.01)

(52) U.S. Cl.
CPC ..... *F04D 27/0238* (2013.01); *F04D 27/0246* (2013.01); *F04D 29/284* (2013.01); *F04D 29/444* (2013.01); *F05D 2220/40* (2013.01)

(58) Field of Classification Search
CPC ............ F04D 27/0238; F04D 27/0246; F04D 29/444
See application file for complete search history.

(56) References Cited

U.S. PATENT DOCUMENTS 3,957,392 A * 5/1976 Blackburn .............. F04D 27/02
                                                    415/161
5,461,860 A * 10/1995 Schegk ................... F02B 37/10
                                                    60/611
(Continued)

FOREIGN PATENT DOCUMENTS

EP           2789861 A1    10/2014

OTHER PUBLICATIONS

International Search Report and Written Opinion in International Application No. PCT/EP2021/060708, mailed Jun. 29, 2021, 15 pages.

(Continued)

*Primary Examiner* — Michael L Sehn
(74) *Attorney, Agent, or Firm* — Meunier Carlin & Curfman LLC (57) ABSTRACT

Embodiments of a compressor stage, in particular for a turbocharging system and/or a turbocompound, and a process for operating a compressor stage are provided herein. The compressor stage comprises an impeller, and a vaned diffuser arranged downstream of the impeller. The vaned diffuser is in fluid connection with an outlet of the impeller and comprises an injection device configured to inject a secondary fluid into the vaned diffuser. The injection device comprises a displaceable port at least partially arranged between an adjacent pair of vanes of the diffuser.

20 Claims, 3 Drawing Sheets

(56) References Cited

U.S. PATENT DOCUMENTS

| | | | |
|---|---|---|---|
| 6,428,915 B1 * | 8/2002 | Ban | H01M 8/04119 |
| | | | 429/450 |
| 7,326,027 B1 | 2/2008 | Skoch et al. | |
| 7,967,556 B2 * | 6/2011 | Gummer | F04D 29/542 |
| | | | 415/58.7 |
| 2006/0104805 A1 | 5/2006 | Gummer | |
| 2006/0115358 A1 | 6/2006 | Umeyama et al. | |
| 2014/0377059 A1 | 12/2014 | Ulrey et al. | |

OTHER PUBLICATIONS

Extended European Search Report in European Application No. 20171388.0, dated Sep. 17, 2020, 7 pages.

* cited by examiner

SECONDARY-FLUID SUPPLY FOR THE DIFFUSER OF A COMPRESSOR STAGE

FIELD OF THE INVENTION

Embodiments hereof relate to a compressor stage, in particular for a turbocharging system and/or a turbocompound, and a process for operating a compressor stage.

BACKGROUND OF THE INVENTION

Many applications utilising compression stages include injecting or recirculating a secondary fluid. For example, modern internal combustion engines oftentimes need to apply exhaust gas recirculation (EGR) to comply with current and future environmental regulations.

Different techniques have been developed for injecting or recirculating the secondary fluid. For internal combustion engines, low pressure EGR and high pressure EGR are commonly employed, depending on at which pressure level the EGR-gas is re-introduced into the air supply path of the engine.

Low pressure EGR comprises introducing the EGR gas at a low pressure level upstream of the impeller of the compression stage, which can lead to severe erosion and corrosion issues, especially with regards to the impeller material.

High pressure EGR comprises introducing the EGR gas downstream of the compression stage, which often requires an additional EGR blower to overcome the pressure difference between the secondary fluid from the engine exhaust manifold and a primary fluid from the air receiver.

One attempt to overcome the problems associated with high and low pressure EGR is to provide a link between the exhaust gas manifold and the zone right between an impeller outlet and a diffuser inlet. The high momentum primary fluid exiting the compressor impeller draws in and pressurizes the EGR-gas like in a jet pump.

Current designs to inject exhaust gas into diffusers comprise slits or holes in the compression stage, which are connected to appropriate supply pipes or channels to inject the secondary fluid into the compressor main flow. The slits or holes are located between the impeller outlet and the diffuser inlet as this is downstream of the impeller-thus avoiding erosion and corrosion issues of the impeller—and upstream of the diffuser—where the static pressure is low enough to draw in the secondary flow stream.

This design, however, leads to operational issues as the diffuser limits the mass flow which can be pushed through the diffuser for given upstream total flow conditions. The diffuser is then either too small for the combined main (primary) and secondary flow (if the secondary flow is switched on) or too large for the main flow only.

BRIEF SUMMARY OF THE INVENTION

Briefly, a compressor stage and a process for operating a compressor stage are provided to overcome at least some of the abovementioned limitations. This object is accomplished by means of a compressor stage, in particular for a turbocharging system and/or a turbocompound, according to claim 1, and a process for operating a compressor stage according to claim 15. In particular, the object of the invention is to provide a compressor stage which allows for injection of a secondary fluid and concurrently is suitable for the combined (primary and secondary) flow rate both when the secondary flow is switched on as well as when it is switched off.

According to an embodiment, a compressor stage, in particular for a turbocharging system and/or a turbocompound, is provided. The compressor stage comprises an impeller and a vaned diffuser arranged downstream of the impeller. The vaned diffuser is in fluid connection with an outlet of the impeller. The vaned diffuser further comprises an injection device configured to inject a secondary fluid into the vaned diffuser. The injection device comprises a displaceable port at least partially arranged between an adjacent pair of vanes of the diffuser.

According to another embodiment, a process for operating a compressor stage for a turbocharging system and/or a turbocompound, in particular a compressor stage assembly according to any embodiments of the present disclosure, is provided. The process comprises determining a desired mass flow of a secondary fluid, in particular an exhaust gas, and determining an effective cross-section of a vaned diffuser of the compressor to maintain an impeller of the compressor within predetermined operating limits. The process further comprises adjusting a cross-section of the vaned diffuser to the effective cross-section, in particular by displacing a displaceable port of an injection device at least partially arranged between an adjacent pair of vanes of the diffuser.

Those skilled in the art will recognise additional features and advantages upon reading the following detailed description, and upon viewing the accompanying drawings.

BRIEF DESCRIPTION OF THE DRAWINGS

The components in the Figures are not necessarily to scale, instead emphasis being placed upon illustrating the principles of the invention. Moreover, in the Figures, like reference signs designate corresponding parts. In the drawings.

DETAILED DESCRIPTION OF THE INVENTION

In the following detailed description, reference is made to the accompanying drawings, which form a part hereof, and in which are shown by way of illustration specific embodiments of the invention.

As used herein, the terms "having", "containing", "including", "comprising" and the like are open ended terms that indicate the presence of stated elements or features, but do not preclude additional elements or features.

It is to be understood that other embodiments may be utilised, and structural or logical changes may be made without departing from the scope of the present invention. The following detailed description, therefore, is not to be taken in a limiting sense, and the scope of the present invention is defined by the appended claims. The embodiments described herein use specific language, which should not be construed as limiting the scope of the appended claims. Each embodiment and each aspect so defined may be combined with any other embodiment or with any other aspect unless clearly indicated to the contrary.

According to an embodiment, a compressor stage 100, in particular for a turbocharging system and/or a turbocompound, is provided.

The compressor stage 100 includes an impeller 110 having an inlet section and an outlet section or exit and a diffuser 120 having a diffuser inlet section 111. The diffuser 120 is arranged downstream of the impeller 110. The diffuser inlet section 111 is in fluid communication with the outlet section of the impeller. The compressor stage 100 is configured to suck in a primary fluid, typically air, at the impeller inlet section and compress and convey the primary fluid through the compressor stage 100. This path through the compressor stage 100 may also be referred to as a flow channel. The compressor stage 100 may be a centrifugal compressor stage.

The diffuser 120 is a vaned diffuser including a plurality of vanes 121, 122, 123. The vaned diffuser 120 has a housing, wherein the vanes 121, 122, 123 are typically fixed to the housing or integrally formed with the housing. The housing may include side walls, in particular a shroud side and/or a hub side. The vanes 121, 122, 123 extend between two opposing side walls of the housing.

Figure 1A:
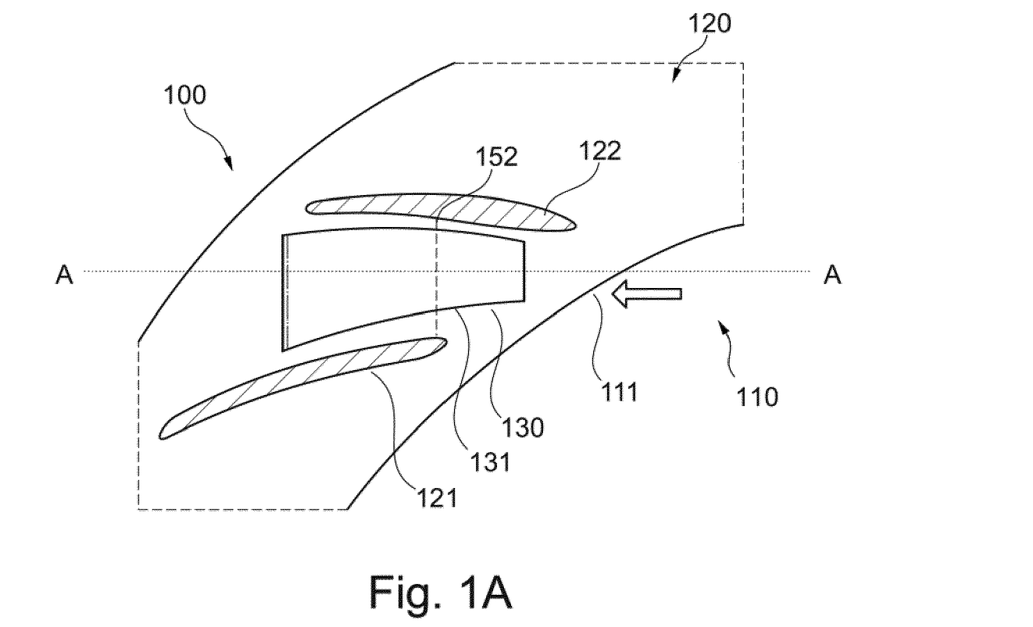
FIG. 1A illustrates a portion of a compressor stage according to an embodiment of the present disclosure.

FIG. 1A shows a portion of a compressor stage 100 according to an embodiment of the present disclosure. The large unfilled arrow illustrates the flow of the primary fluid being conveyed from the impeller 110 (only the location of the impeller is indicated in FIG. 1A) to the diffuser inlet section 111 and further into the vaned diffuser 120. The section of the compressor stage 100 displayed in FIG. 1A includes two vanes 121, 122; however, typically many additional vanes are arranged within the vaned diffuser 120.

Each pair of vanes 121, 122, 123 defines a throat section 150. The throat section 150 is to be understood as a constricted section which limits the mass flow rate of a fluid conveyed through the compressor stage 100. The vaned diffuser 120 typically includes a plurality of throat sections 150, each defined by a respective adjacent pair of vanes 121, 122, 123.

According to an embodiment, the throat section 150 includes an up-stream portion 151 adjacent to the diffuser inlet 111. At some operating points, the up-stream portion 151 may also be referred to as a cross-section reducing portion as the stream-tube cross-section for a fluid conveyed through the vaned diffuser 120 may be increasingly reduced within the up-stream portion 151 of the throat section 150. The throat section 150 further comprises a throat location 152, The throat location 152 is the location adjacent to the respective pair of vanes with the geometrically lowest cross-sectional area. Typically the throat location 152 includes the lowest cross-sectional area of the entire vaned diffuser 120 (aside from other throat locations 152 defined by other adjacent pairs of vanes). The throat section 150 comprises a down-stream portion 153, located downstream of the throat location 152. At some operating points, the down-stream portion may also be referred to as a cross-section expanding portion as the stream-tube cross-section for a fluid conveyed through the vaned diffuser 120 may continuously increase downstream of the throat location 152. The throat section 150 is therefore to be understood as a section largely defined by and largely arranged within an adjacent pair of vanes; however, it is not restricted to a single location. The mass flow rate of a fluid conveyed through the vaned diffuser is particularly affected or limited by the throat location 152, Illustratively, FIGS. 1B and 3B sketch the throat section 150, the up-stream portion 151, the throat location 152 and the down-stream portion 153.

The vaned diffuser 120 further includes an injection device 130. The injection device is configured to inject a secondary fluid into the vaned diffuser 120. In several applications, the secondary fluid is or includes exhaust gas. The injection device 130 comprises a displaceable port 131 at least partially arranged between an adjacent pair of vanes 121, 122, 123 of the diffuser 120. Illustratively, the displaceable port 131 may be limited in one dimension (e.g. perpendicular to the flow of the primary fluid) by the pair of adjacent vanes, i.e. may not extend beyond the pair of adjacent vanes in that dimension. In a second dimension (e.g. parallel to the flow of the primary fluid), the displaceable port 131 may extend between an upstream end of one vane, and a downstream end of the adjacent vane, or even extend from an upstream end of one vane to a downstream end of the adjacent vane. The displaceable port 131 may also be entirely arranged between an adjacent pair of vanes 121, 122, 123 of the diffuser 120. The displaceable port 131 is displaceable in the sense that the relative positioning of at least portions of the port 131 with respect to the vaned diffuser may be changed. For example, the port 131 may be displaced by a rotational or translational movement.

According to another embodiment, the injection device 130 comprises a displaceable port 131 at least partially arranged between a plurality of adjacent pairs of vanes 121, 122, 123. A downstream end portion or downstream end of the displaceable port 131 may extend over a full or partial circumference of the vaned diffuser 120. For example, as an alternative to the embodiment shown in FIG. 2A, the displaceable port 131 may be partially arranged between adjacent vanes 121, 122 and partially arranged between adjacent vanes 122, 123 and extend along vane 122 at the downstream end portion of the displaceable port 131 (or in other words, the displaceable port 131—shown as several separate ports 131 in FIG. 2A—may comprise sections connected or integrally formed at the downstream end portion, in particular approximately perpendicular to the flow of the primary fluid).

The injection device 130 may be configured to inject the secondary fluid into the vaned diffuser 120 when the displaceable port 131 is in an open position and to block a flow of the secondary fluid into the vaned diffuser 120 when the displaceable port 131 is in a closed position. The arrangement of the displaceable port 131 partially between adjacent pairs of vanes enables injection of the secondary fluid at a location of low backpressure of the primary fluid. The static pressure of the primary fluid is relatively low, enabling the secondary flow stream to be drawn in by the primary fluid.

In one embodiment, the injection device 130 is configured to inject the secondary fluid into the throat section 150, preferably within the up-stream portion 151 and/or within the throat location 152 of the throat section. This embodiment enables injection of the secondary fluid at a location of lowest backpressure of the primary fluid. Preferably, the secondary fluid is injected at a position in the vicinity of or even at the highest Mach number of the primary fluid between the diffuser inlet section 111 and a downstream end of the vanes, or even within the vaned diffuser 120.

Figure 3A:
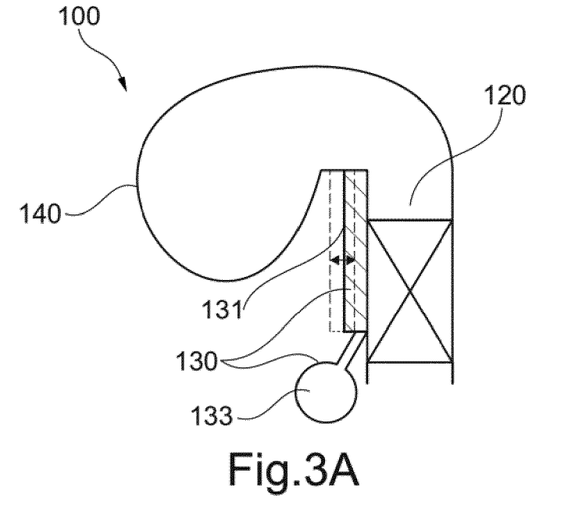
FIG. 3A illustrates a portion of a compressor stage according to an embodiment of the present disclosure.
Figure 3B:
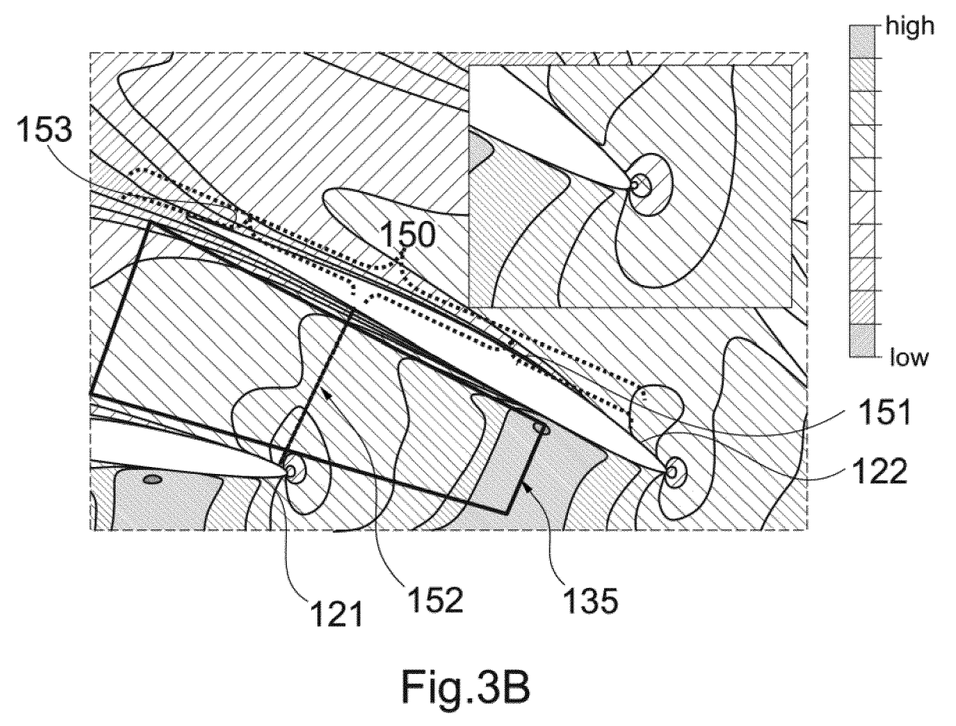
FIG. 3B illustrates a portion of a compressor stage according to an embodiment of the present disclosure.

FIG. 1A displays an embodiment of the displaceable port 131 arranged between an adjacent pair of vanes 121, 122 of the diffuser 120. FIG. 3B is a close up of the compressor stage 100 shown in FIG. 1A. The contours indicate the Mach number of the primary fluid at a particular operating point. In this particular example, i.e. at this particular operating point, a highest Mach number is obtained in the up-stream portion 151 slightly upstream of the throat location 152. At other operating points, the highest Mach number may be obtained at the throat location 152, for example. The displaceable port 131 is arranged such that an injection location 135 is at a position in the vicinity of the highest Mach number of the primary fluid.

Embodiments of the present disclosure advantageously enable introducing the secondary gas downstream of the impeller, thus avoiding erosion and corrosion to the impeller while concurrently allowing for injection of the secondary fluid at a location of low backpressure of the primary fluid. An additional blower for the secondary fluid is therefore not required. The high momentum primary fluid exiting the compressor impeller 110 draws in and pressurises the secondary fluid like in a jet pump.

The displaceable port 131 according to the present disclosure is configured to adjust an effective cross-section (or effective cross-sectional area) of the vaned diffuser 120. In particular, the effective cross-section between the vanes 121, 122, 123 or the throat section 150 is adjustable by displacement of the port 131. Advantageously, adjustment of the cross-section of the throat section 150 results in an adjustment of the cross-section of the throat location 152. The effective cross-section of the throat location (152) is adjustable by displacement of the port (131).

The vaned diffuser 120 may be designed such that the cross-sectional area of the throat location 152, or in other words a mass flow rate, is sufficient for the primary fluid when the secondary fluid is not injected and the displaceable port 131 is in the closed position. Displacement of the port 131 allows for the secondary fluid to be injected, which in turn results in a higher mass flow. Concurrently, the effective cross-sectional area of the throat location 152 is increased in the open position, which advantageously allows for the combined primary and secondary flow to pass the throat section 150 without impeding the compressor stage 100 performance. The impeller can deliver the same mass flow rate with and without the secondary fluid being injected and can operate at its optimum performance both when the secondary air flow is switched on and off. By adjusting the effective cross-sectional area to the amount of secondary flow to be injected, an ideal cross-sectional area can be assured for each operation point.

The secondary fluid may be injected without being limited by the mass flow rate of the secondary fluid. The displaceable port 131 thus allows for flexible flow conditions, which can be adapted according to a required or desired flow rate of the secondary fluid. The compressor stage according to the present disclosure overcomes the drawbacks of prior art constant geometry configurations of the diffuser. Embodiments disclosed herein allow for adjusting the diffuser geometry for a large range of secondary fluid streams to be injected into the primary stream. Further, it is assured that the increased mass flow can pass the diffuser without pushing the impeller into surge. Additionally, displacement of the port allows for adjusting the change in flow area along the streamlines within the diffuser 120.

Figure 1B:
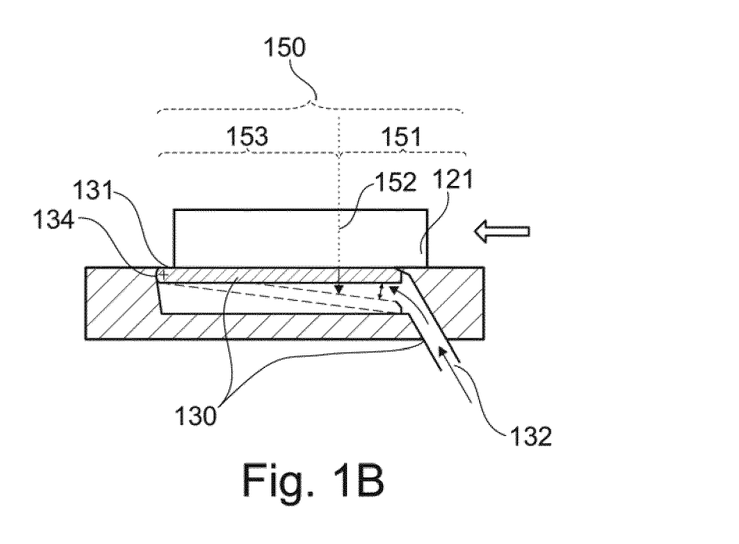
FIG. 1B illustrates a portion of a compressor stage according to an embodiment of the present disclosure.

FIG. 1B illustrates a section of the compressor stage 100 of FIG. 1A along the line A-A, The flow of the primary fluid is indicated by the large unfilled arrow on the right hand side of FIG. 1B. In this embodiment, the displaceable port 131 is convertible or movable from a closed position—the displaceable port 131 is illustrated as bold lines—to an open position—the displaceable port 131 is illustrated as dashed lines. The arrow drawn below the throat location 152 indicates the increase of the cross-sectional area in the open position compared to the closed position.

Figure 2A:
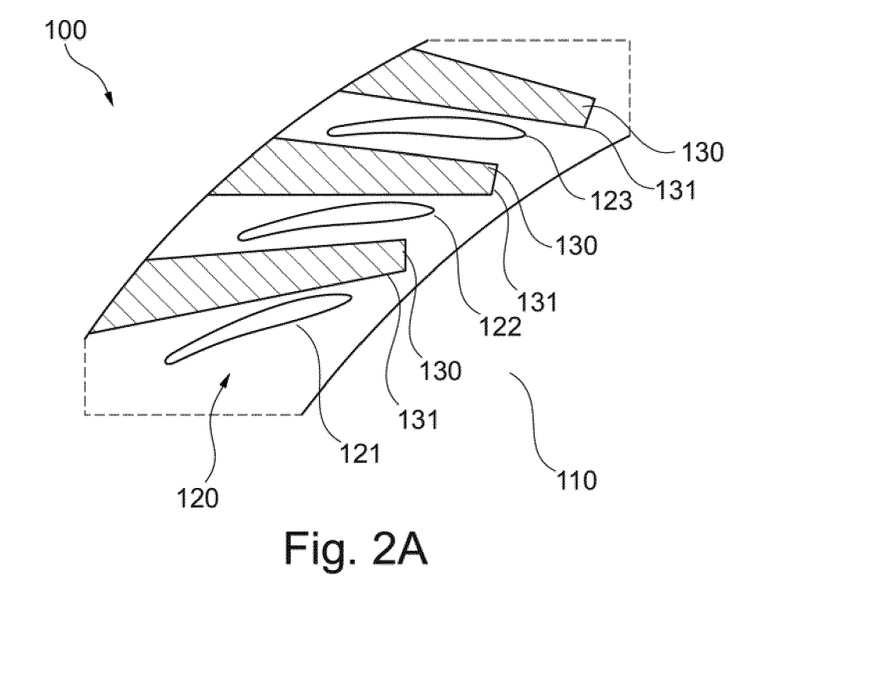
FIG. 2A illustrates a portion of a compressor stage according to an embodiment of the present disclosure.
Figure 2B:
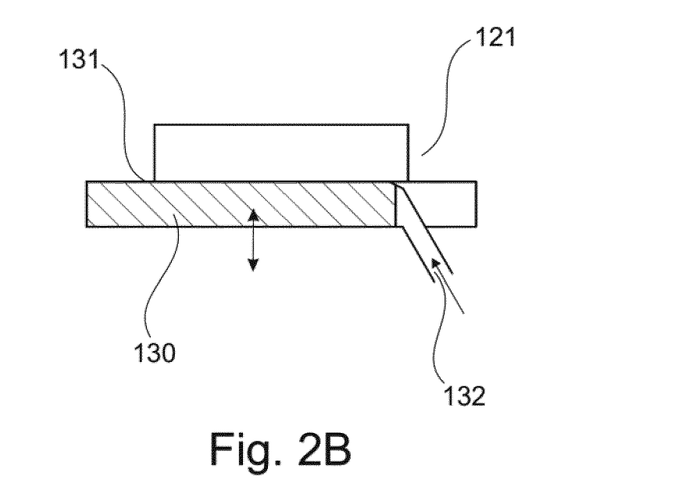
FIG. 2B illustrates a portion of a compressor stage according to an embodiment of the present disclosure.

According to one aspect, the injection device 130 includes an actuating mechanism configured to move or translate the displaceable port 131 between the open position and the closed position. For example, the actuating mechanism may include a hydraulic, a mechanic, a pneumatic, or a sensor controlled actuator. FIGS. 2B and 3A illustrate examples of a compressor stage including an actuating mechanism (the actuating mechanism is not shown in the Figures). The left-right arrows in FIG. 3A and the up-down arrows in FIG. 2B indicate a translation of the displaceable port 131 approximately perpendicular to the flow of the primary fluid. In FIG. 3A, the displaceable port 131 is illustrated as bold lines in the closed position and as dashed lines in the open position. The diagonal arrow in FIG. 2B indicates a flow direction of the secondary fluid.

According to another aspect, the injection device 130 includes a pivoting mechanism configured to pivot the displaceable port 131 between the open position and the closed position. FIG. 1B illustrates an example of a compressor stage including a pivoting mechanism. The injection device 130 may further include one or more joints 134, which pivotably mounts the displaceable port 131 to the vaned diffuser 120. The joint 134 is preferably arranged downstream of the throat location 152, such that pivoting the displaceable port 131 leads to a substantial increase in the cross-sectional area in the vicinity of the throat location 152. According to this aspect, the port may also be referred to as flap.

According to one aspect, the injection device 130 is configured to inject the secondary fluid substantially parallel to the flow of the primary fluid in the vaned diffuser 120. The injection device may include a secondary fluid channel 132. The secondary fluid channel may be in fluid connection with a secondary fluid supply 133. The secondary fluid channel 132 may be arranged at a small angle with respect to the flow of the primary fluid. The injection device 130 may further include a flow regulator or valve. The flow regulator may be arranged within the secondary fluid channel 132 or further upstream of the secondary fluid channel 132. The flow regulator may be configured to regulate the mass flow of the secondary fluid. The mass flow of the secondary fluid may then be controlled by the flow regulator while the effective cross-sectional area may be controlled by the port 131, thereby decoupling the two functionalities. However, the compressor stage of the present disclosure does not require the flow regulator or valve. The mass flow of the secondary fluid may also be controlled or regulated by the displacement of the port 131.

According to one aspect, the displaceable port 131 is arranged within the housing of the vaned diffuser 120. The port 131 may be a wall section of the vaned diffuser 120. In the closed position, the port may be flush with the remaining side wall of the vaned diffuser 120. In other words, the displaceable port 131 does not protrude into the flow channel of the primary fluid of the vaned diffuser 120 in the closed position and does not affect the flow of the primary fluid. The port 131 is convertible from the closed position to the open position by displacing the port 131 away from the flow channel. The port 131 also does not protrude into the flow channel of the primary fluid in the open position. An opening motion of the port 131 corresponds to a partial retraction of the port 131 behind the remaining side wall of the vaned diffuser 120. The port 131 may be arranged within a shroud side and/or hub side of the housing. In case the injection device 130 includes a pivoting mechanism, a downstream end of the port 131 may be flush with the remaining side wall of the vaned diffuser 120 in the open position.

In an alternative aspect, the displaceable port 131 is arranged within the vanes 121, 122, 123 of the vaned diffuser 120. Typically, the vanes of a vaned diffuser have a rather limited extent perpendicular to the flow of the primary fluid. This embodiment is particularly suitable when a modest variation of the cross-sectional area by means of the port 131 is sufficient.

The compressor stage 100 may further include a conical diffuser section 140 or volute (reference is made for example to FIG. 3A). The conical diffuser section 140 is arranged downstream of the vaned diffuser 120, and in particular downstream of the down-stream portion 153 and upstream of a compressor stage outlet section. The length of the down-stream portion 153 along the flow channel of the primary fluid may be more than or equal to the distance between the throat location 152 and the downstream end of the port 131 along the flow direction of the primary fluid.

The compressor stage 100 may further include a control unit. The control unit may be configured to displace the port 131 (e.g. by controlling the actuating mechanism or by controlling the pivoting mechanism) enabling injection of the secondary fluid and/or adjusting the effective cross-section of the throat section 150 to a predetermined level. The control unit may also be configured to control the mass flow of the secondary fluid (e.g. by controlling the flow regulator).

The vaned diffuser may include a plurality of displaceable ports 131. Each of the plurality of displaceable ports 131 may be at least partially arranged between an adjacent pair of vanes 121, 122, 123. FIG. 2A displays a portion of the vaned diffuser 120, wherein three vanes 121, 122, 123 and three ports 131 are shown. According to one exemplary embodiment, the vaned diffuser 120 includes a port 131 arranged between every adjacent pair of vanes 121, 122, 123. According to another exemplary embodiment, the plurality of ports 131 may be arranged in a pattern. For example, ports 131 may be arranged between every second adjacent pair of vanes 121, 122, 123. The control unit may be configured to displace the plurality of ports 131 and/or control the mass flow of the secondary fluid individually, i.e. independent of each other.

According to an embodiment, a turbocharging system is provided. The turbocharging system includes a compressor stage according to any of the embodiments disclosed herein. The turbocharger system includes one or more turbocharger stages. At least one of the turbocharger stages includes the compressor stage according to any of the embodiments disclosed herein. In one exemplary aspect, each turbocharger stage includes the compressor stage according to any of the embodiments disclosed herein. In another exemplary aspect, one turbocharger stage includes the compressor stage according to any of the embodiments disclosed herein, whereas the other turbocharger stages may not be configured for injection of a secondary fluid.

According to an embodiment, an engine is provided. The engine includes a turbocharging system according to any of the embodiments disclosed herein. In one aspect, the engine is an internal combustion engine. The injection device 130, and in particular the secondary fluid channel 132, may be in fluid connection with an exhaust gas manifold of the engine.

According to another embodiment, a gas engine, in particular a hydrogen combustion engine, is provided. The gas engine includes a compressor stage according to any of the embodiments disclosed herein. The injection device 130, and in particular, the secondary fluid channel 132 may be in fluid connection with an exhaust gas outlet of the gas engine.

According to another embodiment, a fuel cell, in particular a hydrogen fuel cell, is provided. The fuel cell includes a compressor stage according to any of the embodiments disclosed herein. The injection device 130, and in particular the secondary fluid channel 132, may be in fluid connection with an exhaust gas outlet of the fuel cell. In one aspect, the fuel cell is a proton exchange membrane fuel cell or polymer electrolyte membrane fuel cell (PEMFC). The injection device 130, and in particular the secondary fluid channel 132, is in fluid connection with a secondary fluid supply 133. The secondary fluid is preferably water (liquid water and/or water vapour), and the secondary fluid supply 133 is a water supply. Injection of water by the injection device 130 allows for supplying moisture or humidification of at least one membrane of the fuel cell. Advantageously, supplying water for humidification through the compressor stage to the at least one membrane of the fuel cell allows for an improved distribution—and even management—of the water within the fuel cell core. Simultaneously, injection of the water downstream of the impeller of the compression stage avoids or at least mitigates erosion and corrosion issues of the impeller.

According to another embodiment, a fuel cell, in particular a hydrogen fuel cell, is provided. The fuel cell includes a compressor stage according to any of the embodiments disclosed herein. The injection device 130, and in particular the secondary fluid channel 132, may be in fluid connection with one or more (dedicated) tank(s). In one aspect, the fuel cell is a proton exchange membrane fuel cell or polymer electrolyte membrane fuel cell (PEMFC). The injection device 130, and in particular the secondary fluid channel 132, is in fluid connection with a secondary fluid supply 133. The secondary fluid is preferably water (liquid water and/or water vapour), and the secondary fluid supply 133 is a water supply. Injection of water by the injection device 130 allows for supplying moisture or humidification of at least one electrolyte membrane of the fuel cell. Advantageously, supplying water for humidification through the compressor stage to the at least one membrane of the fuel cell allows for an improved distribution—and even better management—of the water within the fuel cell core. Simultaneously, injection of the water downstream of the impeller of the compression stage avoids or at least mitigates erosion and corrosion issues of the impeller. At least one of the tank(s) may be connected to one or several condenser(s) of the fuel cell and/or one or several separator(s) of the fuel cell to recover water from any water source of the fuel cell. At least one of the tank(s) may preferably be partially or completed filled with water from an external source from the fuel) cell. The injection device 130 may be configured for supplying water directly from any of the one or several condenser(s) and/or from any of the one or several separator(s) and/or from any of the one or more water tank(s).

The compressor stage and/or the turbocharger system according to any of the embodiments disclosed herein may be used for a variety of applications, including vehicles or industrial applications. Although the background section emphasises exhaust gas recirculation in internal combustion engines as one intended field of application, embodiments disclosed herein are not limited to applications in internal combustion engines or even to exhaust gas. The compressor stage disclosed herein also enables injecting other secondary fluids, such as air, gaseous fuel, or an air-fuel mixture.

According to another embodiment, a process for operating a compressor stage for a turbocharging system and/or a turbocompound is provided. The compressor stage may be any compressor stage described herein.

The process includes determining a desired mass flow of a secondary fluid. Typically, the desired mass flow corresponds to a value predetermined by a user or manufacturer. For example, for applications utilising internal combustion engines, the desired mass flow may be a required mass flow of exhaust gas determined such that compliance with environmental regulations is ensured.

The process further includes determining an effective cross-section of a vaned diffuser 120 of the compressor to maintain an impeller 110 of the compressor stage 100 within predetermined operating limits. Typically, the impeller 110 can only be operated within certain operating limits without impeding the impeller 110 performance. In case the mass flow of the secondary fluid is substantially increased without changing other parameters of the impeller, such as the geometry of the flow path of the primary fluid, the increased mass flow may push the impeller into surge, A required effective cross-section is determined based on the desired mass flow of the secondary fluid and the predetermined operating limits.

The process further includes adjusting a cross-section of the vaned diffuser 120 to the effective cross-section. The cross-sectional area may be adjusted by displacing a displaceable port 131 of an injection device 130 according to any embodiment described herein. The displaceable port 131 may be at least partially arranged between an adjacent pair of vanes 121, 122, 123 of the diffuser 120.

LIST OF REFERENCE SIGNS

100 compressor stage
110 impeller
111 diffuser inlet section
120 vaned diffuser
121, 122, 123 vanes
130 injection device
131 displaceable port
132 secondary fluid channel
133 secondary fluid supply
134 joint
140 conical diffuser section/volute
150 throat section
151 up-stream portion
152 throat location
153 down-stream portion.

The invention claimed is:

1. A compressor stage comprising:
an impeller; and
a vaned diffuser arranged downstream of the impeller and being in fluid connection with an outlet of the impeller, the vaned diffuser comprising an injection device configured to inject a secondary fluid into the vaned diffuser;
wherein the injection device comprises a displaceable port at least partially arranged between an adjacent pair of vanes of the diffuser, and
wherein the displaceable port is displaceable such that a relative positioning of at least portions of the displaceable port with respect to the vaned diffuser can be changed.

2. The compressor stage according to claim 1, wherein the vaned diffuser comprises a throat section defined by the adjacent pair of vanes.

3. The compressor stage according to claim 2, wherein the injection device is configured to inject the secondary fluid into the throat section.

4. The compressor stage according to claim 2, wherein the throat section comprises an up-stream portion adjacent to a diffuser inlet section, a throat location, and a down-stream portion.

5. The compressor stage according to claim 4, wherein the injection device is configured to inject the secondary fluid within the up-stream portion and/or within the throat location.

6. The compressor stage according to claim 1, wherein an effective cross-section of the vaned diffuser is adjustable by displacement of the port.

7. The compressor stage according to claim 1, wherein the injection device is configured to inject the secondary fluid into the vaned diffuser when the displaceable port is in an open position and to block a flow of the secondary fluid into the vaned diffuser when the displaceable port is in a closed position.

8. The compressor stage according to claim 7, wherein the injection device comprises an actuator configured to move the displaceable port between the open position and the closed position.

9. The compressor stage according to claim 7, wherein the displaceable port is configured to pivot between the open position and the closed position.

10. The compressor stage according to claim 1, wherein the secondary fluid is exhaust gas.

11. The compressor stage according to claim 1, wherein the injection device is configured to inject the secondary fluid substantially parallel to the flow of the primary fluid in the vaned diffuser.

12. The compressor stage according to claim 1, wherein the displaceable port is arranged within a housing of the vaned diffuser.

13. The compressor stage according to claim 1, wherein the displaceable port comprises a plurality of displaceable ports, wherein each of the plurality of displaceable ports is at least partially arranged between an adjacent pair of vanes.

14. A turbocharger system comprising the compressor stage according to claim 1.

15. A fuel cell comprising the compressor stage according to claim 1.

16. The fuel cell of claim 15, wherein the fuel cell is a proton exchange membrane fuel cell, and wherein the secondary fluid is liquid water and/or water vapour.

17. The fuel cell of claim 16, wherein the injection device further comprises a liquid water and/or water vapour supply for humidification of at least one membrane of the proton exchange membrane fuel cell.

18. A process for operating a compressor stage for a turbocharging system and/or a turbocompound comprising the following sequence of steps:
determining a desired mass flow of a secondary fluid;
determining an effective cross-section of a vaned diffuser of the compressor stage, to maintain an impeller of the compressor stage within predetermined operating limits; and
adjusting a cross-section of the vaned diffuser to an effective cross-section.

19. The process of claim 18, further comprising adjusting the cross-section of the vaned diffuser to the effective cross-section by displacing a displaceable port of an injection device at least partially arranged between an adjacent pair of vanes of the diffuser.

20. A compressor stage comprising:
an impeller; and
a vaned diffuser arranged downstream of the impeller and being in fluid connection with an outlet of the impeller, the vaned diffuser comprising an injection device configured to inject a secondary fluid into the vaned diffuser;
wherein the injection device comprises a displaceable port at least partially arranged between an adjacent pair of vanes of the diffuser, and
wherein the injection device is configured to inject the secondary fluid into the vaned diffuser when the displaceable port is in an open position and to block a flow of the secondary fluid into the vaned diffuser when the displaceable port is in a closed position.

* * * * *